US012792382B2

(12) United States Patent
Park et al.

(10) Patent No.: US 12,792,382 B2
(45) Date of Patent: Nov. 10, 2026

(54) SYSTEM ON CHIP TEMPERATURE MANAGEMENT IN A VIRTUAL ENVIRONMENT

(71) Applicant: Samsung Electronics Co., Ltd., Suwon-si (KR)

(72) Inventors: Chung Woo Park, Suwon-si (KR); Bo Youn Park, Suwon-si (KR); Soung Kwan Kimn, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 419 days.

(21) Appl. No.: 18/469,050

(22) Filed: Sep. 18, 2023

(65) Prior Publication Data

US 2024/0362057 A1 Oct. 31, 2024

(30) Foreign Application Priority Data

Apr. 26, 2023 (KR) ........................ 10-2023-0054729

(51) Int. Cl.
*G06F 9/455* (2018.01)
*G06F 1/08* (2006.01)

(52) U.S. Cl.
CPC ............ *G06F 9/45558* (2013.01); *G06F 1/08* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS 8,819,676 B2 8/2014 Ports et al.
9,092,251 B2 7/2015 Grouzdev
(Continued)

OTHER PUBLICATIONS

Radio Frequency (Year: 2000).*
ARM Virtualization: Performance and Architectural Implications (Year: 2016).*

*Primary Examiner* — Kim Huynh
(74) *Attorney, Agent, or Firm* — Harness, Dickey & Pierce, P.L.C.

(57) ABSTRACT

A system on chip includes a first core cluster configured to execute a first virtual machine loaded into a memory, the first core cluster including a plurality of first cores, and a second core cluster configured to execute a second virtual machine loaded into the memory, the second virtual machine including a plurality of second cores, wherein a first core of the plurality of first cores is configured to execute the first virtual machine at a first exception level (EL) to generate a first temperature value request, execute a hypervisor loaded into the memory at a second exception level different from the first exception level to receive a first temperature value from temperature management circuitry, in response to the first temperature value request, and execute the first virtual machine at the first exception level to check the received first temperature value, and wherein a second core of the plurality of second cores is configured to execute the second virtual machine at the first exception level to generate a second temperature value request, execute the hypervisor at the second exception level to receive a second temperature value from the temperature management circuitry, in response to the second temperature value request, and execute the second virtual machine at the first exception level to check the received second temperature value.

20 Claims, 11 Drawing Sheets

(56) References Cited

U.S. PATENT DOCUMENTS

| | | | | |
|---|---|---|---|---|
| 9,099,051 | B2 | 8/2015 | Cheng et al. | |
| 9,158,564 | B2 | 10/2015 | Maity et al. | |
| 10,210,014 | B2 | 2/2019 | Srivastava et al. | |
| 10,275,268 | B2 | 4/2019 | Krempa et al. | |
| 10,430,222 | B2 | 10/2019 | Maity et al. | |
| 10,782,754 | B2 | 9/2020 | Wang | |
| 2013/0155073 | A1* | 6/2013 | Khodorkovsky | G09G 5/363 345/501 |
| 2013/0305067 | A1* | 11/2013 | Lefurgy | G06F 1/206 713/320 |
| 2018/0285166 | A1* | 10/2018 | Roy | G06F 9/5077 |
| 2021/0224089 | A1* | 7/2021 | Laplace | G06F 9/45558 |
| 2023/0195487 | A1* | 6/2023 | Duchesne | G06F 9/4555 718/1 |
| 2024/0256646 | A1* | 8/2024 | Rosemarine | G06F 9/4881 |

* cited by examiner

SYSTEM ON CHIP TEMPERATURE MANAGEMENT IN A VIRTUAL ENVIRONMENT

CROSS-REFERENCE TO RELATED APPLICATIONS

This application claims priority from Korean Patent Application No. 10-2023-0054729 filed on Apr. 26, 2023 in the Korean Intellectual Property Office, the disclosure of which is incorporated herein by reference in its entirety.

BACKGROUND

1. Field

The present invention relates to a system on chip and an electronic device including the same.

2. Description of the Related Art

A system on chip (SoC) includes a processor for controlling connected semiconductor device. A processor of the system on chip may perform a calculation, and control the operation of the semiconductor device by transmitting and receiving signals. Here, the system on chip may include a plurality of processors, and the plurality of processors may perform different functions from each other.

SUMMARY

Some example embodiments of the inventive concepts provide a system on chip having improved performance and an electronic device including the same.

However, some example embodiments of the inventive concepts are not restricted to the ones set forth herein. The above and other example embodiments of the inventive concepts will become more apparent to one of ordinary skill in the art to which the present invention pertains by referencing the detailed description of the inventive concepts given below.

According to some example embodiments of the inventive concepts, there is provided a system on chip including a first core cluster configured to execute a first virtual machine loaded into a memory, the first core cluster including a plurality of first cores, and a second core cluster configured to execute a second virtual machine loaded into the memory, the second core cluster including a plurality of second cores, wherein a first core of the plurality of first cores is configured to execute the first virtual machine at a first exception level (EL) to generate a first temperature value request, execute a hypervisor loaded into the memory at a second exception level different from the first exception level to receive a first temperature value from temperature management circuitry, in response to the first temperature value request, and execute the first virtual machine at the first exception level to check the received first temperature value, and wherein a second core of the plurality of second cores is configured to execute the second virtual machine at the first exception level to generate a second temperature value request, execute the hypervisor at the second exception level to receive a second temperature value from the temperature management circuitry, in response to the second temperature value request, and execute the second virtual machine at the first exception level to check the received second temperature value.

According to some example embodiments of the inventive concepts, there is provided an electronic device including a memory into which a first virtual machine, a second virtual machine, and a hypervisor are loaded, a system on chip including a first core cluster configured to execute the first virtual machine, the first core cluster including a plurality of first cores, and a second core cluster configured to execute the second virtual machine, the second core cluster including a plurality of second cores, and temperature management circuitry configured to measure a temperature value, wherein a first core of the plurality of first cores is configured to execute the first virtual machine at a first exception level to generate a first temperature value request, execute the hypervisor at a second exception level different from the first exception level to receive a first temperature value from the temperature management circuitry, in response to the first temperature value request, and execute the first virtual machine at the first exception level to check the received first temperature value, and wherein a second core of the plurality of second cores is configured to execute the second virtual machine at the first exception level to generate a second temperature value request, execute the hypervisor at the second exception level to receive a second temperature value from the temperature management circuitry, in response to the second temperature value request, and execute the second virtual machine at the first exception level to check the received second temperature value.

According to some example embodiments of the inventive concepts, there is provided an electronic device including a memory device storing an instruction, and a first core and a second core configured to execute the instruction, wherein the instruction, when executed by the first core, is configured to cause the first core to generate a first temperature value request at a first exception level, receive a first temperature value from temperature management circuitry at a second containment level different than the first containment level, in response to the first temperature value request, and check the first temperature value received at the first exception level, and wherein the instruction, when executed by the second core, is configured to cause the second core to generate a second temperature value request at the first acquisition level, receive a second temperature value from the temperature management circuitry at the second exception level, in response to the second temperature value request, and check the second temperature value received at the first exception level.

BRIEF DESCRIPTION OF THE DRAWINGS

The above and other example embodiments and features of the inventive concepts will become more apparent by describing in detail exemplary embodiments thereof with reference to the attached drawings, in which.

DETAILED DESCRIPTION OF THE EMBODIMENTS

Hereinafter, some example embodiments according to the inventive concepts will be described with reference to the accompanying drawings.

Figure 1:
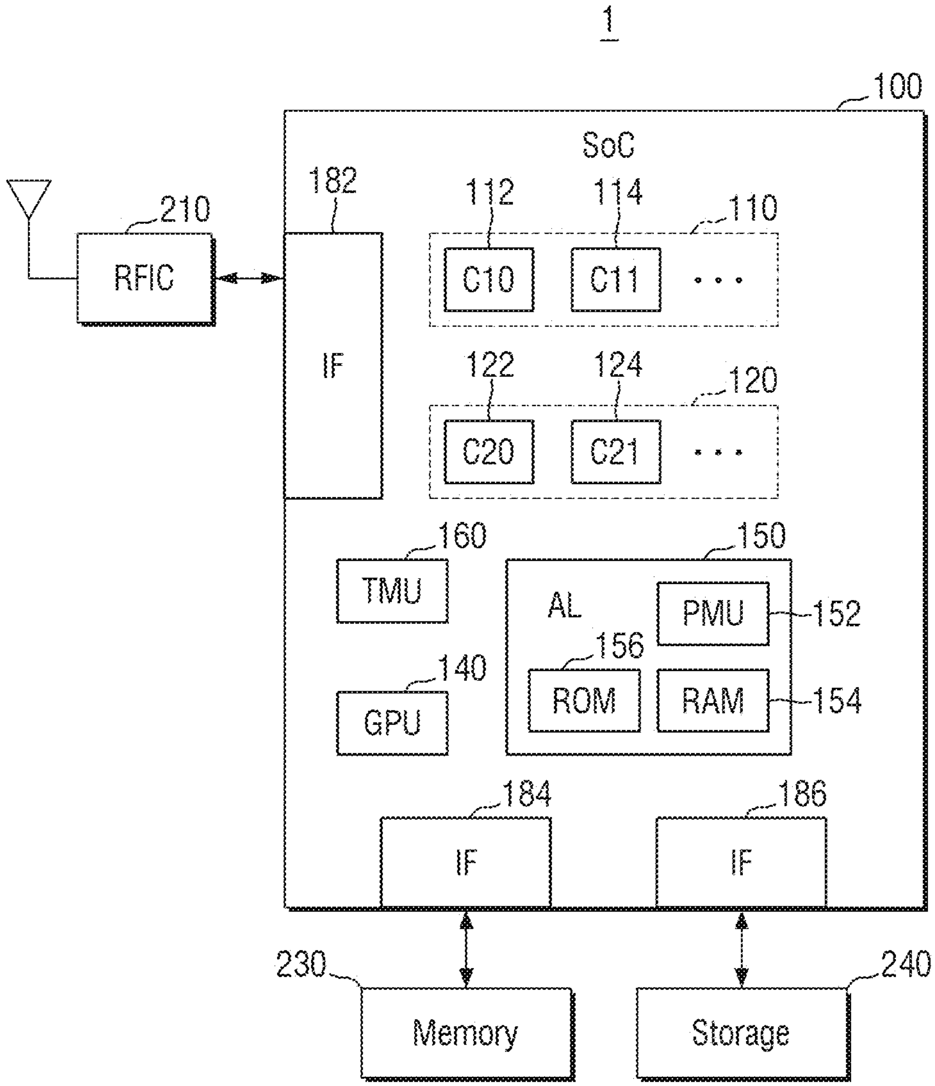
FIG. 1 is a block diagram of an electronic device including a System on Chip (SoC) according to some example embodiments.

FIG. 1 is a block diagram of an electronic device including a SoC (System on Chip) according to some example embodiments.

Referring to FIG. 1, the electronic device 1 may include a SoC (System on Chip) 100, an RF circuit 210, a memory device 230, and/or a storage device 240.

The SoC 100 may include a first core cluster 110, a second core cluster 120, a GPU (Graphic Processing Unit) 140, an alive module 150, a temperature management unit 160, and/or a plurality of interfaces 182, 184 and/or 186. In some example embodiments, the SoC 100 may further include a plurality of components that are not shown.

The first core cluster 110 may include a plurality of cores including a core 112 and/or a core 114. The second core cluster 120 may include a plurality of cores including a core 122 and/or a core 124.

In some example embodiments, the first core cluster 110 may perform the calculation required for the SoC 100 to operate as an application processor (AP) inside the electronic device 1.

The cores 112 and/or 114 included in the first core cluster 110 execute first virtual machine program (e.g., VM1P of FIG. 3) for executing the AP operation, so that the first virtual machine (e.g., VM1 of FIG. 4) may operate as an AP.

In some example embodiments, the second core cluster 120 may perform the calculation required for the SoC 100 to operate as a communication processor (CP) inside the electronic device 1.

The cores 122 and/or 124 included in the second core cluster 120 execute second virtual machine program (e.g., VM2P of FIG. 3) for performing the CP operation, such that a second virtual machine (e.g., VM2 of FIG. 4) operates as a CP.

However, the example embodiments are not limited thereto, and the roles of the first core cluster 110 and/or the second core cluster 120 may be differently modified and implemented as necessary.

The GPU 140 may perform graphics processing on the data. The GPU 140 may process, for example, image data to be displayed on the display device of the electronic device 1.

The alive module 150 may include a power management unit 152, a random access memory (RAM) 154, and/or a read only memory (ROM) 156.

The power management unit 152 may manage the power supplied into the SoC 100. In some example embodiments, the power management unit 152 may manage power which is provided to the first core cluster 110 and/or the second core cluster 120.

The RAM 154 and/or the ROM 156 may be used for the SoC 100 to perform an initialization operation. As will be described later, when the electronic device 1 is initialized, a bootloader may be loaded into the ROM 154 using code stored in the ROM 156 and executed by a core (e.g., 122) to initialize the SoC 100.

The temperature management unit 160 includes a temperature sensor, and may read temperature values through the temperature sensor. The temperature management unit 160 may be implemented by, for example, processing circuitry and may be referred to as temperature management circuitry. The first core cluster 110 and/or the second core cluster 120 request the temperature management unit 160 temperature values, and the temperature management unit 160 may sends the temperature values measured using the temperature sensor to the first core cluster 110 and/or the second core cluster 120.

The SoC 100 is connected to the RF circuit 210, the memory device 230 and/or the storage device 240, and may control the RF circuit 210, the memory device 230 and/or the storage device 240.

The RF circuit 210 may receive and process radio signals from an antenna, or send the processed signals to the outside through the antenna. The RF circuit 210 may operate in a 3G (Generation) mode, a 4G mode, a 5G mode, or the like, and may change its operating mode depending on a control signal sent from the SoC 100. The RF circuit 210 is connected to the SoC 100 through the interface 182, and may transmit and receive signals and data.

The memory device 230 may temporarily store and maintain programs or data necessary, or sufficient, for driving the SoC 100. In some embodiments, the memory device 230 may be a volatile memory device. For example, although the memory device 230 may include a dynamic random access memory (DRAM), the example embodiments are not limited thereto. Programs necessary for driving the SoC 100 may be loaded into such a memory device 230. The memory device 230 may be connected to the SoC 100 through the interface 184.

The storage device 240 may store data necessary, or sufficient, for driving the electronic device 1 and programs or data necessary for driving the SoC 100. Here, the storage device 240 may include a non-volatile memory device such as a NAND flash and/or a NOR flash. Data stored in the storage device 240 may be loaded into the memory device 230 under control of the SoC 100. The storage device 240 may be connected to the SoC 100 through the interface 186.

Although FIG. 1 shows an example in which the first core cluster 110, the second core cluster 120, the GPU 140, the alive module 150, and the temperature management unit 160 are mounted on one chip, the example embodiments are not limited thereto, and some configurations can also be implemented as other chips as needed.

The operation of generating a virtual machine in the SoC will be described below with reference to FIGS. 1 to 4.

Figure 2:
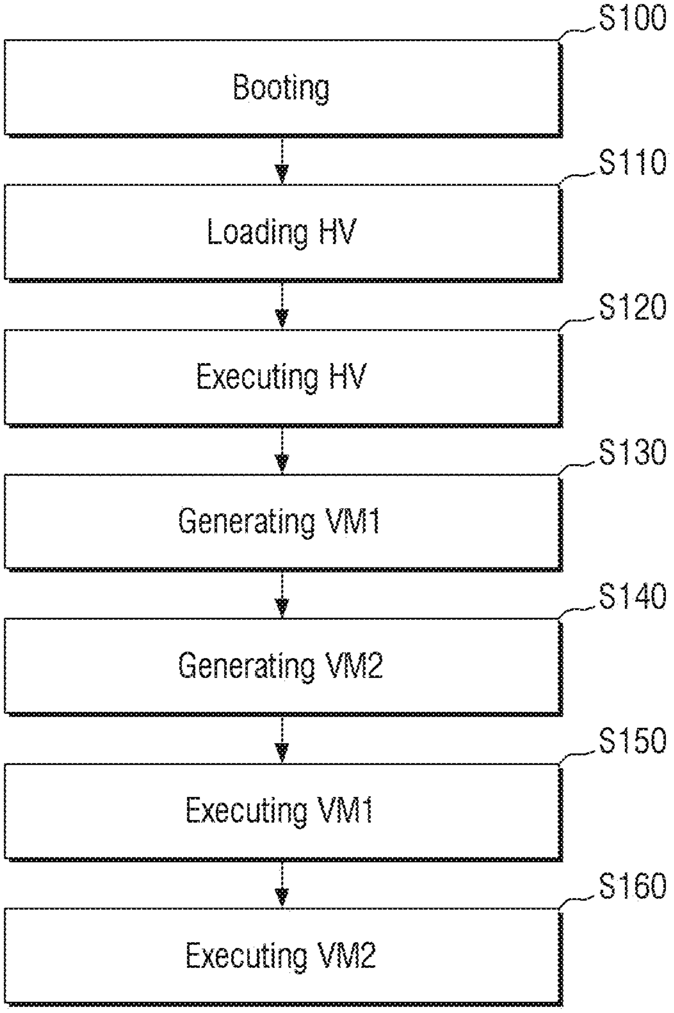
FIG. 2 is a flowchart showing an operation in which a virtual machine is generated on the SoC according to some example embodiments.
Figure 3:
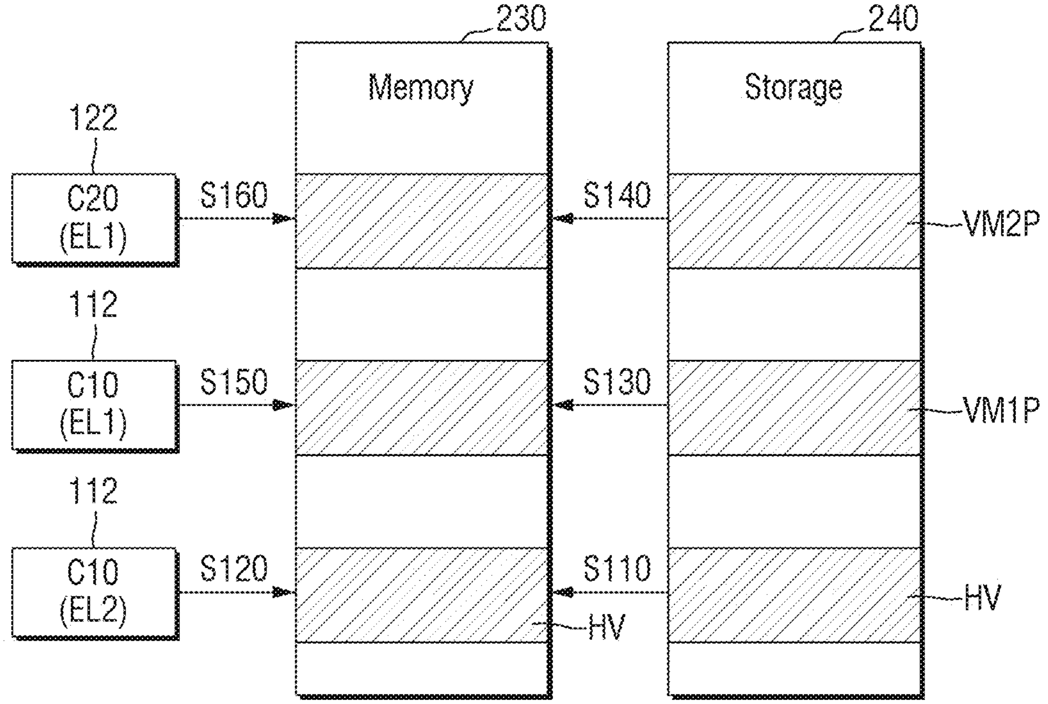
FIGS. 3 and 4 are diagrams for explaining the operation of FIG. 2.
Figure 4:
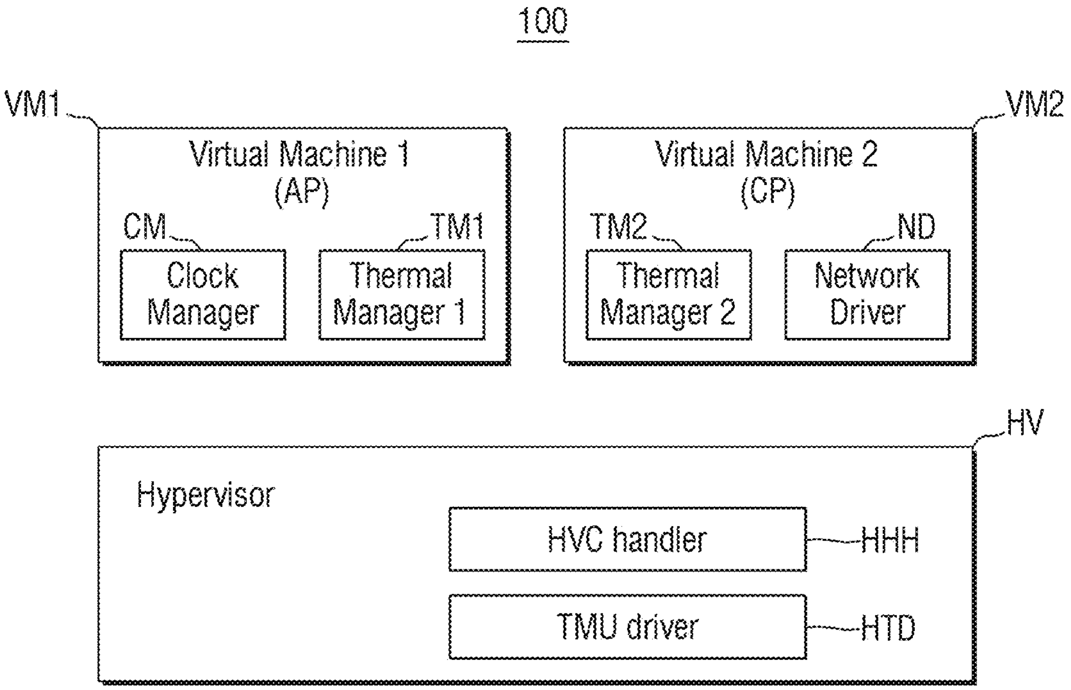

FIG. 2 is a flowchart showing an operation in which the virtual machine is generated on the SoC according to some embodiments. FIGS. 3 and 4 are diagrams for explaining the operation of FIG. 2.

Referring to FIG. 2, an electronic device including the SoC 100 is booted up (S100).

Referring to FIG. 1, when the electronic device 1 is booted up, the SoC 100 is powered on, and the bootloader may be loaded from the storage device 240 into the RAM 154 by referring to the code stored in the ROM 156 in the alive module 150. The core 112 may execute the bootloader loaded into the RAM 154 to prepare the memory device 230 for use and perform the initialization operation.

Although an example in which the bootloader is executed by the core 112 will be described below, the example embodiments are not limited thereto. In some example embodiments, any one of the cores 114, 122, and/or 124 may execute the bootloader loaded into the RAM 154.

When the bootloader is executed by the core 112, the core 112 may execute the bootloader at EL3 (Exception Level 3).

Next, referring to FIG. 2, a hypervisor HV is loaded (S110).

Referring to FIGS. 1 to 4, for example, as the core 112 executes the bootloader, the hypervisor HV stored on the storage device 240 in the form of software may be loaded into the memory device 230.

Next, referring to FIG. 2, the hypervisor HV is executed (S120).

Referring to FIGS. 1 to 4, for example, an exception level of the core 112 is changed from EL3 to EL2, and the core 112 may execute the hypervisor HV loaded into the memory device 230.

As a result, a temperature management driver HTD and a hypervisor call handler HHH may be set up on the hypervisor HV.

The temperature management driver HTD may receive temperature values from the hardware temperature management unit 160 by the request of the hypervisor call handler HHH.

The hypervisor call handler HHH may mange an operation in which the virtual machines VM1 and/or VM2 request the temperature management driver HTD the temperature values through the hypervisor call HVC, and an operation of providing the temperature values received from the temperature management driver HTD to the virtual machines VM1 and/or VM2, between the virtual machines VM1 and/or VM2 and the temperature management driver HTD.

Next, referring to FIG. 2, the first virtual machine is generated (S130).

Referring to FIGS. 1 to 4, for example, as the core 112 executes the hypervisor HV, the first virtual machine program VM1P stored on the storage device 240 in the form of software may be loaded into the memory device 230.

Such a first virtual machine program VM1P may include a first OS (Operating System) that drives the first virtual machine, and the first virtual machine VM1 may be driven on the basis of the first OS.

Next, referring to FIG. 2, a second virtual machine is generated (S140).

Referring to FIGS. 1 to 4, for example, as the core 112 executes the hypervisor HV, a second virtual machine program VM2P stored on the storage device 240 in the form of software may be loaded into the memory device 230.

The second virtual machine program VM2P may include a second OS that drives the second virtual machine, and the second virtual machine VM2 may be driven on the basis of the second OS.

In some example embodiments, the second OS included in the second virtual machine program VM2P may differ from the first OS included in the first virtual machine program VM1P. For example, although the first virtual machine program VM1P may include Linux as an OS, and the second virtual machine program VM2P may include a program other than Linux as an OS, embodiments are not limited thereto.

In some example embodiments, inside the memory device 230, the first virtual machine program VM1P and the second virtual machine program VM2P may be distinguished from each other and loaded independently, as shown. Accordingly, when the cores 112 and/or 114 included in the first core cluster 110 are executed at the EL1, the first virtual machine program VM1P loaded in the memory device 230 may be executed, but the second virtual machine program VM2P may not be executed.

Also, when the cores 122 and/or 124 included in the first core cluster 120 are executed at EL1, the second virtual machine program VM2P loaded in the memory device 230 may be executed, but the virtual machine program VM1P may not be executed.

Next, referring to FIG. 2, the first virtual machine is executed (S150).

Referring to FIGS. 1 to 4, for example, the exception level of the core 112 is changed from EL2 to EL1, and the core 112 may execute the first virtual machine program VM1P loaded in the memory device 230. Therefore, when the first OS included in the first virtual machine program VM1P is executed, and the first virtual machine VM1 executes the function of the application processor (AP), the functions related to the operation of the application processor may be set up.

In some example embodiments, as the core 112 executes the first virtual machine program VM1P loaded into the memory device 230, a thermal manager TM1 and/or a clock manager CM may be set up inside the first virtual machine VM1.

The thermal manager TM1 may request the temperature management driver HTD the temperature value through a hypervisor call to manage the heat generation of the SoC 100, and the clock manager CM may manage the clocks of the cores 112, 110 and/or 114 included in the first core cluster 110.

Next, referring to FIG. 2, the second virtual machine is executed (S160).

Referring to FIGS. 1 to 4, for example, the core 122 may execute the second virtual machine program VM2P loaded into the memory device 230 at EL1. Therefore, the second OS included in the second virtual machine program VM2P may be executed. As explained above, when the first OS included in the first virtual machine program VM1P and the second OS included in the second virtual machine program VM2P are different from each other, the first virtual machine VM1 and the second virtual machine VM2 may operate on different operating systems from each other.

When the second virtual machine VM2 executes the functions of a communication processor CP, functions related to the operation of the communication processor may be set up.

In some example embodiments, as the core 122 executes the second virtual machine program VM2P loaded into the memory device 230, the thermal manager TM2 and/or the network driver ND may be set up inside the second virtual machine VM2.

A thermal manager TM2 may request the temperature management driver HTD a temperature value through the hypervisor call to manage the heat generation of the SoC 100, and the network driver ND may request the RF circuit 210 to change the communication mode.

A thermal management method of the SoC according to some example embodiments will be described below with reference to FIGS. 5 to 8.

Figure 5:
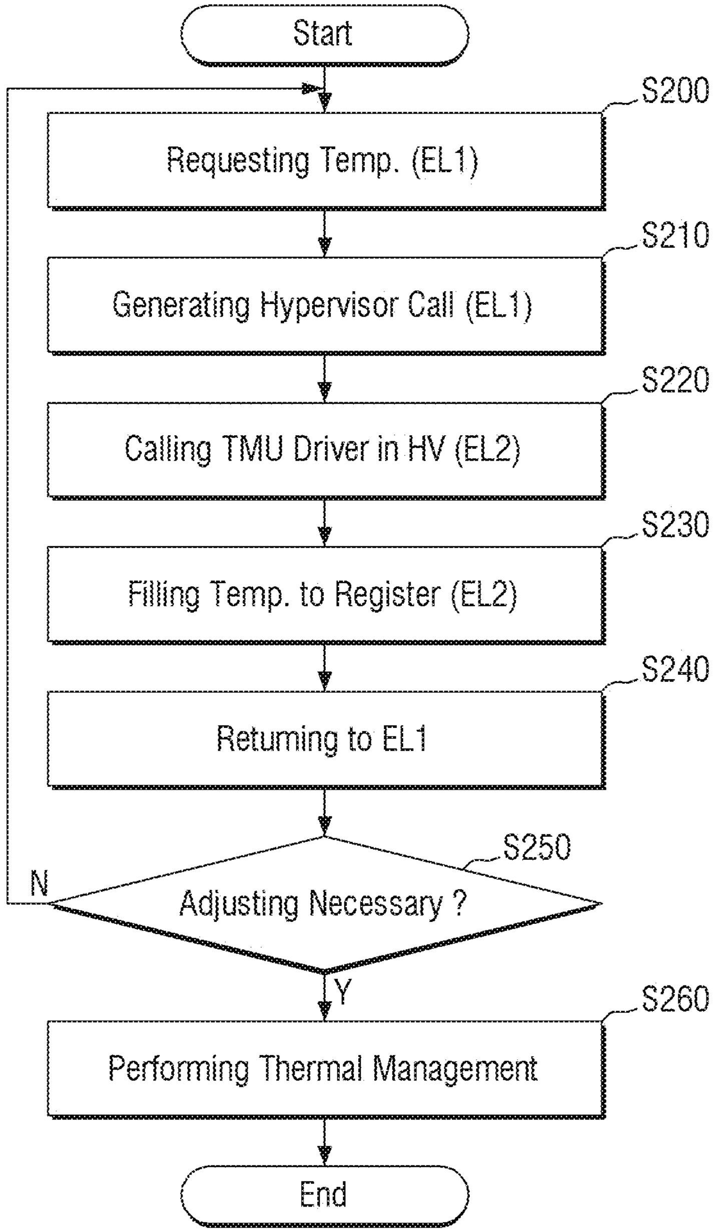
FIG. 5 is a flow chart showing a thermal management method of the SoC according to some example embodiments.
Figure 6:
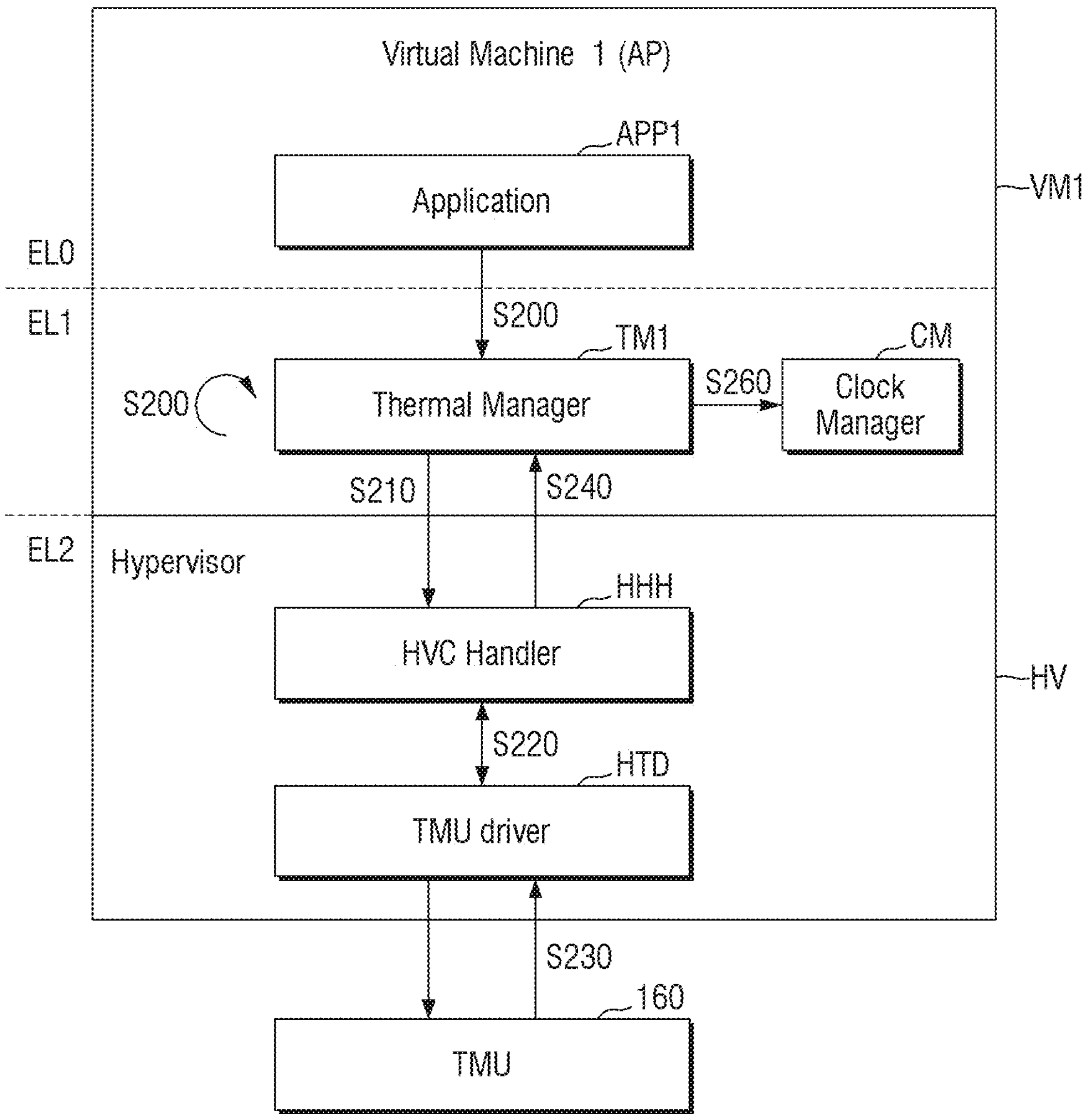
FIGS. 6 to 8 are diagrams for explaining the operation of FIG. 5.
Figure 7:
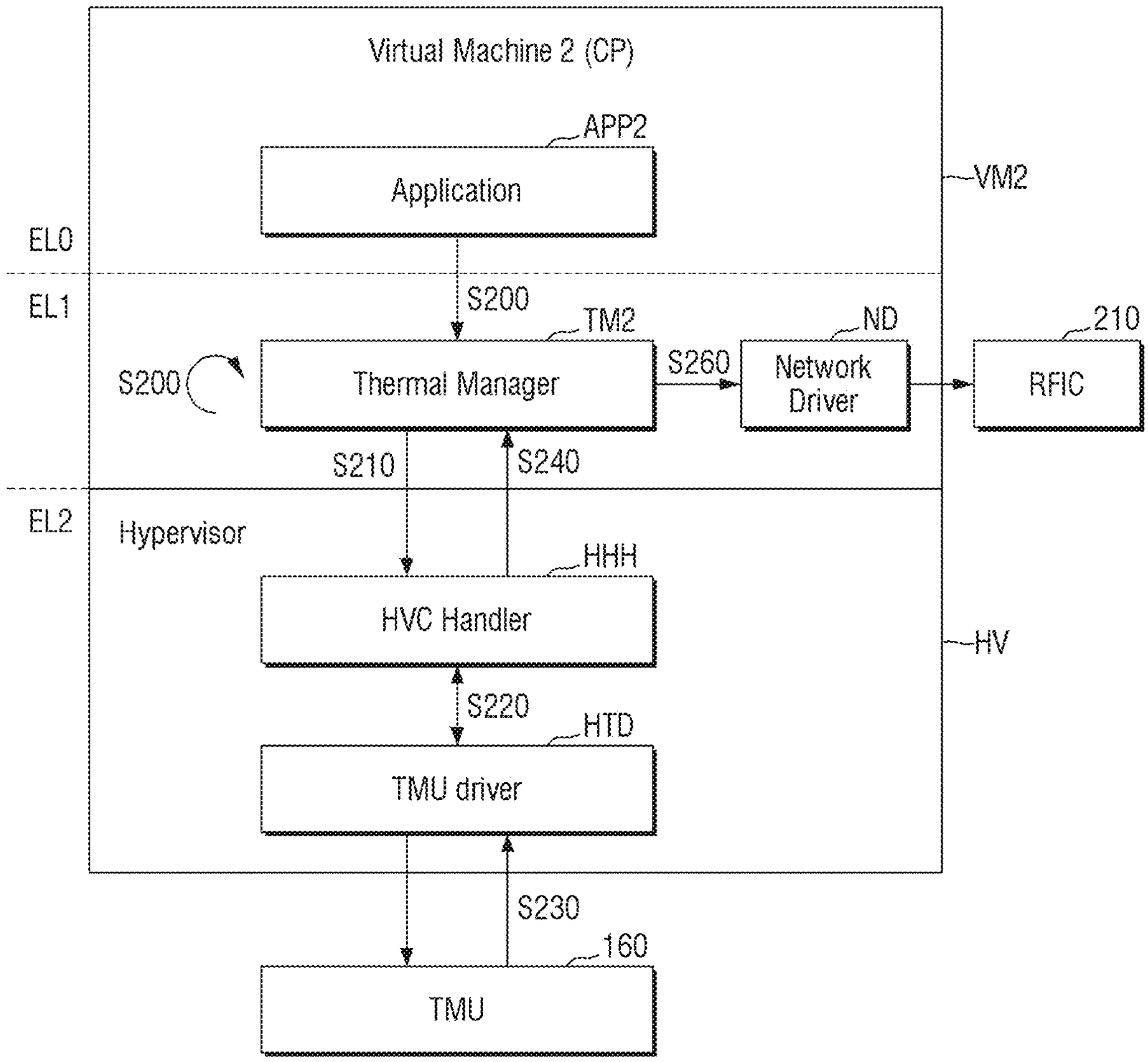
Figure 8:
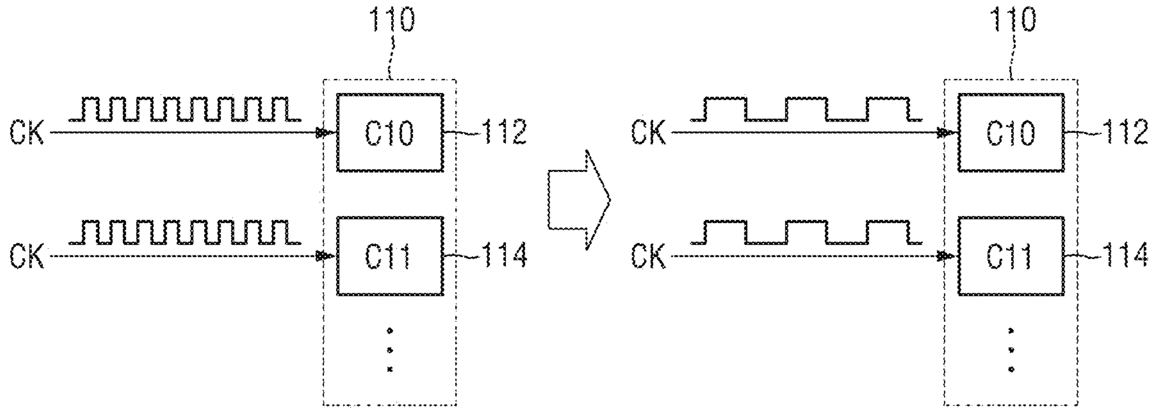

FIG. 5 is a flow chart showing the thermal management method of the SoC according to some embodiments. FIGS. 6 to 8 are diagrams for explaining the operation of FIG. 4. Although FIGS. 6 and 7 separately show the first virtual machine VM1 and the second virtual machine VM2 for convenience of explanation, the first virtual machine VM1 and the second virtual machine VM2 may operate independently on the basis of the hypervisor HV, as shown in FIG.

4. For example, the first virtual machine VM1 and the second virtual machine VM2 may concurrently perform the operations described below on the basis of the hypervisor HV.

First, referring to FIG. 5, a temperature value is requested (S200).

For example, referring to FIG. 6, the thermal manager TM1 of the first virtual machine VM1 may request temperature values at predetermined (or alternatively given) intervals (e.g., n seconds, where n is a natural number). For example, referring to FIGS. 1 and 3, any one of the cores included in the first core cluster 110 may execute and perform the thermal manager TM1 of the first virtual machine program VM1P at EL1.

On the other hand, in some example embodiments, the application program APP1 of the first virtual machine VM1 may request the temperature value. For example, referring to FIGS. 1 and 3, any one of the cores included in the first core cluster 110 may execute the application APP1 at EL0 to request the thermal manager TM1 a temperature value.

For example, referring to FIG. 7, the thermal manager TM2 of the second virtual machine VM2 may request temperature values at predetermined (or alternatively given) intervals. For example, referring to FIGS. 1 and 3, any one of the cores included in the second core cluster 120 may execute and perform the thermal manager TM2 of the second virtual machine program VM2P at EL1.

On the other hand, in some example embodiments, the application program APP2 of the second virtual machine VM2 or the application program (APP1 of FIG. 6) of the first virtual machine VM1 may request the temperature value. For example, referring to FIGS. 1 and 3, any one of the cores included in the second core cluster 120 may execute the application APP2 at EL0 to request the thermal manager TM2 a temperature value.

Next, referring to FIG. 5, a hypervisor call is generated (S210).

For example, referring to FIG. 6, the thermal manager TM1 of the first virtual machine VM1 may generate a hypervisor call to read the temperature value in response to the request for the temperature value. For example, referring to FIGS. 1 and 3, any one of the cores included in the first core cluster 110 may execute and perform the thermal manager TM1 of the first virtual machine program VM1P at EL1.

For example, referring to FIG. 7, the thermal manager TM2 of the second virtual machine VM2 may generate a hypervisor call to read the temperature value in response to the request for the temperature value. For example, referring to FIGS. 1 and 3, any one of the cores included in the second core cluster 120 may execute and perform the thermal manager TM2 of the second virtual machine program VM2P at EL1.

Next, referring to FIG. 5, the temperature management driver is called (S220).

For example, referring to FIG. 6, the hypervisor call handler HHH of the hypervisor HV may call the temperature management driver HTD to read the temperature value. For example, referring to FIGS. 1 and 3, any one of the cores included in the first core cluster 110 may execute and perform the hypervisor call handler HHH and temperature management driver HTD of the hypervisor HV at EL2.

For example, referring to FIG. 7, the hypervisor call handler HHH of the hypervisor HV may call the temperature management driver HTD to read the temperature value. For example, referring to FIGS. 1 and 3, any one of the cores included in the second core cluster 120 may execute and perform the hypervisor call handler HHH and temperature management driver HTD of the hypervisor HV at EL2.

Next, referring to FIG. 5, a temperature value is provided from the temperature management unit and stored in a register (S230).

For example, referring to FIG. 6, the temperature management driver HTD of the hypervisor HV may request the temperature management unit 160 a temperature value, receive the temperature value from the temperature management unit 160, and store it in the register. For example, referring to FIGS. 1 and 3, any one of the cores included in the first core cluster 110 may execute and perform the temperature management driver HTD of the hypervisor HV at EL2.

For example, referring to FIG. 7, the temperature management driver HTD of the hypervisor HV may request the temperature management unit 160 a temperature value, receive the temperature value from the temperature management unit 160, and store it in the register. For example, referring to FIGS. 1 and 3, any one of the cores included in the second core cluster 120 may execute and perform the temperature management driver HTD of the hypervisor HV at EL2.

Next, referring to FIG. 5, the process returns to EL1 (S240).

For example, referring to FIG. 6, the hypervisor call handler HHH of the hypervisor HV may enable the thermal manager TM1 of the first virtual machine VM1 to be executed, for example, through an eret command, when the temperature value is stored at the register. For example, referring to FIGS. 1 and 3, any one of the cores included in the first core cluster 110 may execute and perform the hypervisor call handler HHH of the hypervisor HV at EL2.

For example, referring to FIG. 7, the hypervisor call handler HHH of the hypervisor HV may enable the thermal manager TM2 of the second virtual machine VM2 to be executed, for example, through the eret command, when the temperature value is stored at the register. For example, referring to FIGS. 1 and 3, any one of the cores included in the second core cluster 120 may execute and perform the hypervisor call handler HHH of the hypervisor HV at EL2.

Next, referring to FIG. 5, it is determined whether an adjustment is required (S250).

For example, referring to FIG. 6, the thermal manager TM1 of the first virtual machine VM1 may check the temperature value stored at the register, and check whether the stored temperature value is equal to or greater than a predetermined (or alternatively given) value. As used herein, a predetermined (or alternately given) value may be referred to as a threshold and/or as a threshold value. For example, referring to FIGS. 1 and 3, any one of the cores included in the first core cluster 110 may execute and perform the thermal manager TM1 of the first virtual machine program VM1P at EL1.

For example, referring to FIG. 7, the thermal manager TM2 of the second virtual machine VM2 may check the temperature value stored in the register, and check whether the stored temperature value is equal to or greater than a predetermined (or alternatively given) value. For example, referring to FIGS. 1 and 3, any one of the cores included in the second core cluster 120 may execute and perform the thermal manager TM2 of the second virtual machine program VM2P at EL1.

Next, referring to FIG. 5, if there is no situation in which the adjustment is required (S250-N), the next temperature value request is waited, and if there is a situation in which the adjustment is required (S250-Y), the thermal management is performed (S260).

For example, referring to FIG. 6, if the stored temperature value is smaller than a predetermined (or alternatively given) value, the thermal manager TM1 of the first virtual machine VM1 determines that there is no situation in which the SoC 100 requires the thermal management, and waits for the next temperature value request.

However, if the stored temperature value is equal to or greater than the predetermined (or alternatively given) value, the thermal manager TM1 of the first virtual machine VM1 determines that there is a situation in which the SoC 100 requires the thermal management. Therefore, the thermal management may be performed.

For example, the thermal manager TM1 of the first virtual machine VM1 may cause the clock manager CM to control the clock provided to the first core cluster 110, when it is determined that there is a situation which requires the thermal management. For example, the thermal manager TM1 of the first virtual machine VM1 may adjust the frequency of the clock provided to the first core cluster 110 to a lower frequency through the clock manager CM as shown in FIG. 8, when it is determined that there is a situation which requires the thermal management. Accordingly, the cores 112 and 114 included in the first core cluster 110 may operate at a lower frequency, and heat generation of the SoC 100 may decrease, accordingly.

For example, referring to FIGS. 1 and 3, any one of the cores included in the first core cluster 110 may execute and perform the thermal manager TM1 and the clock manager CM among the first virtual machine programs VM1P at EL1.

For example, referring to FIG. 7, if the stored temperature value is smaller than a predetermined (or alternatively given) value, the thermal manager TM2 of the second virtual machine VM2 determines that there is no situation in which the SoC 100 requires the thermal management, and waits for the next temperature value request.

However, if the stored temperature value is equal to or greater than the predetermined (or alternatively given) value, the thermal manager TM2 of the second virtual machine VM2 determines that there is a situation in which the SoC 100 requires the thermal management. Therefore, the thermal management may be performed.

For example, the thermal manager TM2 of the second virtual machine VM2 may cause the network driver ND to transmit a control signal to the RF circuit 210, when it is determined that there is a situation that requires the thermal management. For example, the thermal manager TM2 of the second virtual machine VM2 may transmit the control signal to the RF circuit 210 through the network driver ND to change the operating mode of the RF circuit 210, when it is determined that there is a situation which requires the thermal management. For example, when the RF circuit 210 is operating in a 5G mode, the network driver ND may transmit the control signal to the RF circuit 210 to cause the RF circuit 210 to operate in a 4G mode or a 3G mode. As a result, an amount of calculation for data received from the RF circuit 210 decreases, and heat generation of the SoC 100 may decrease.

For example, referring to FIGS. 1 and 3, any one of the cores included in the second core cluster 120 may execute and perform the thermal manager TM2 and the network driver ND among the second virtual machine programs VM2P at EL1.

Figure 9:
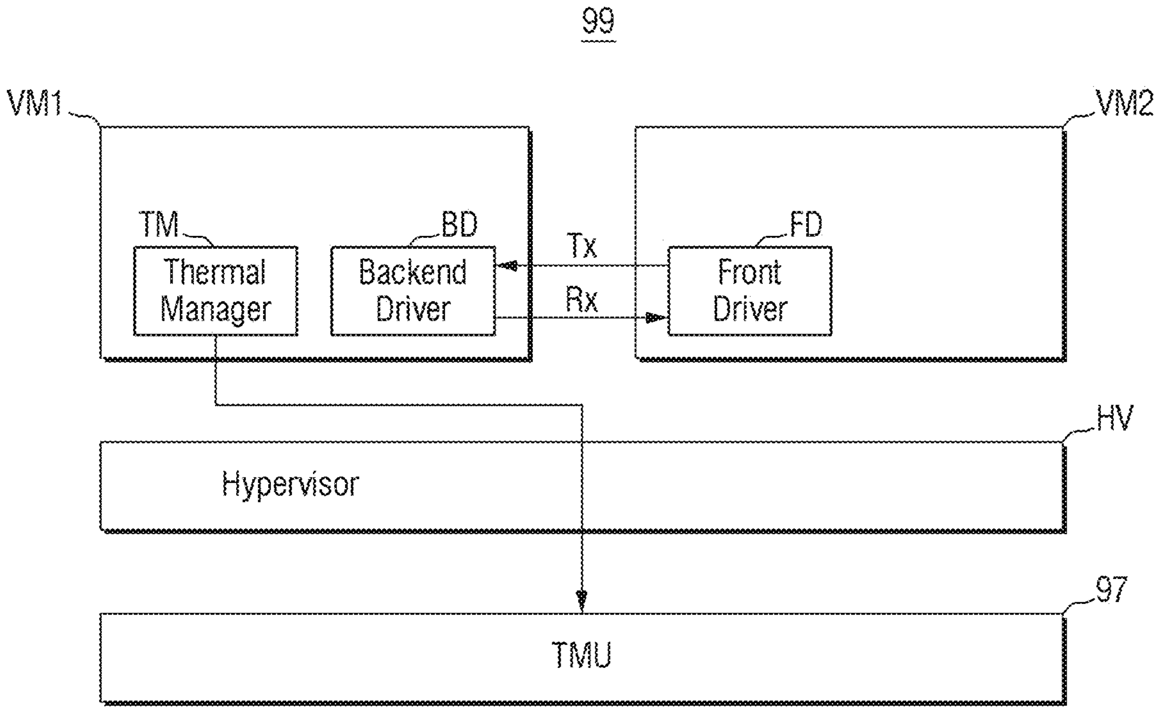
FIG. 9 is a diagram for explaining the effect of SoC according to some example embodiments.

FIG. 9 is a diagram for explaining the effect of SoC according to some embodiments.

FIG. 9 is a diagram which shows a SoC 99 that receives information about shared resources, using a para virtualization driver, unlike the SoC 100 explained above.

In the case of the shown SoC 99, the first virtual machine VM1 may operate by being designated as a host domain, and the second virtual machine VM2 may operate by being designated as a guest domain.

If the second virtual machine VM2 requires the temperature value of the temperature management unit 97, the second virtual machine VM2 may request the first virtual machine VM1 the temperature value through the front driver FD inside the second virtual machine VM2. The first virtual machine VM1 receives the request through the backend driver BD, and receives the temperature value from the temperature management unit 97 through the thermal manager TM and the hypervisor HV of the first virtual machine VM1, and then may send the temperature value to the second virtual machine VM2 through a route opposite to the route in which the request is received.

In the case of such a SoC 99, because it is possible to send information about shared resources when the first virtual machine VM1 and the second virtual machine VM2 are driven on the basis of the same OS, and the first virtual machine VM1 designated as a host domain always needs to be driven for sending information, the power consumption inevitably gets worse.

On the other hand, in the case of the SoC 100 according to the example embodiments explained above, the temperature values may be received, for example from a shared resource such as the temperature management unit 160, independently even if the first virtual machine VM1 and the second virtual machine VM2 are driven on the basis of different OSs, and the first virtual machine VM1 does not necessarily need to operate when the second virtual machine VM2 performs the thermal management. Accordingly, the power consumption may also decrease. That is, the performance of the SoC can be improved.

Figure 10:
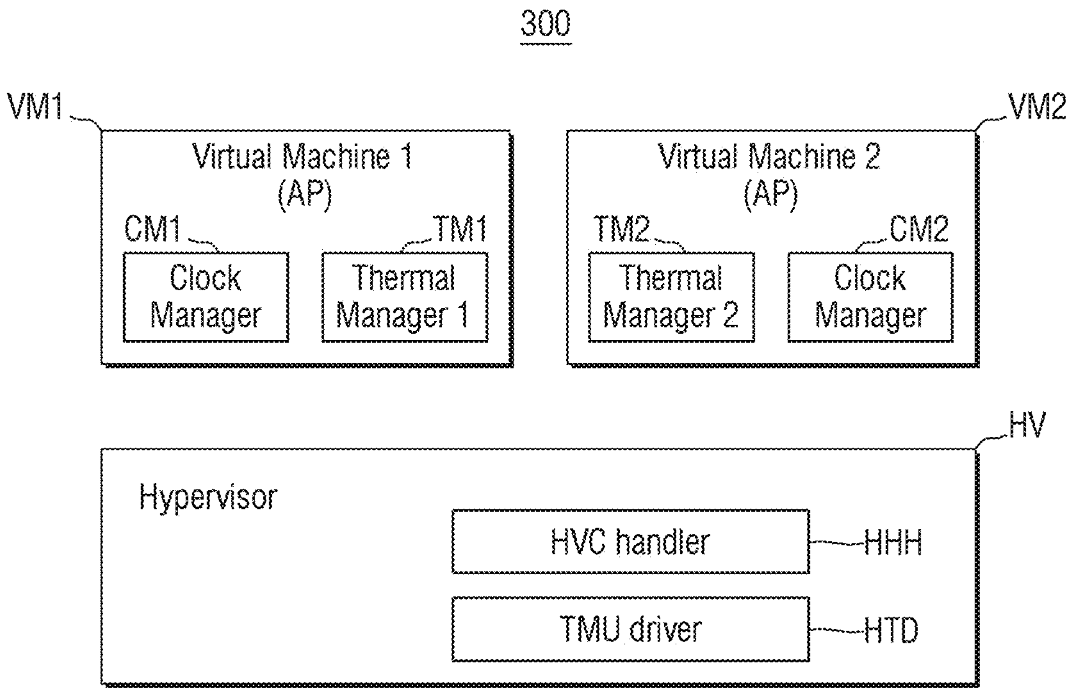
FIG. 10 is a diagram showing a SoC according to some other example embodiments.

FIG. 10 is a diagram showing a SoC according to some other embodiments.

Hereinafter, repeated explanations of the aforementioned example embodiments will not be provided, and differences will be mainly explained.

Referring to FIG. 10, both the first virtual machine VM1 and the second virtual machine VM2 of the SoC 300 may operate with the AP.

Referring to FIGS. 1 and 10, if the received temperature value is equal to or greater than a predetermined (or alternatively given) value, the thermal manager TM1 of the first virtual machine VM1 may adjust the frequency of the clock provided to the first core cluster 110 to a lower frequency through the clock manager CM1. Accordingly, the cores 112 and 114 included in the first core cluster 110 may operate at a lower frequency, and the heat generation of the SoC 300 may decrease, accordingly.

Further, if the received temperature value is equal to or greater than the predetermined (or alternatively given) value, the thermal manager TM2 of the second virtual machine VM2 may adjust the frequency of the clock provided to the second core cluster 120 to a lower frequency through the clock manager CM2. Accordingly, the cores 122 and 124 included in the second core cluster 120 may operate at a lower frequency, and the heat generation of the SoC 300 may decrease, accordingly.

Figure 11:
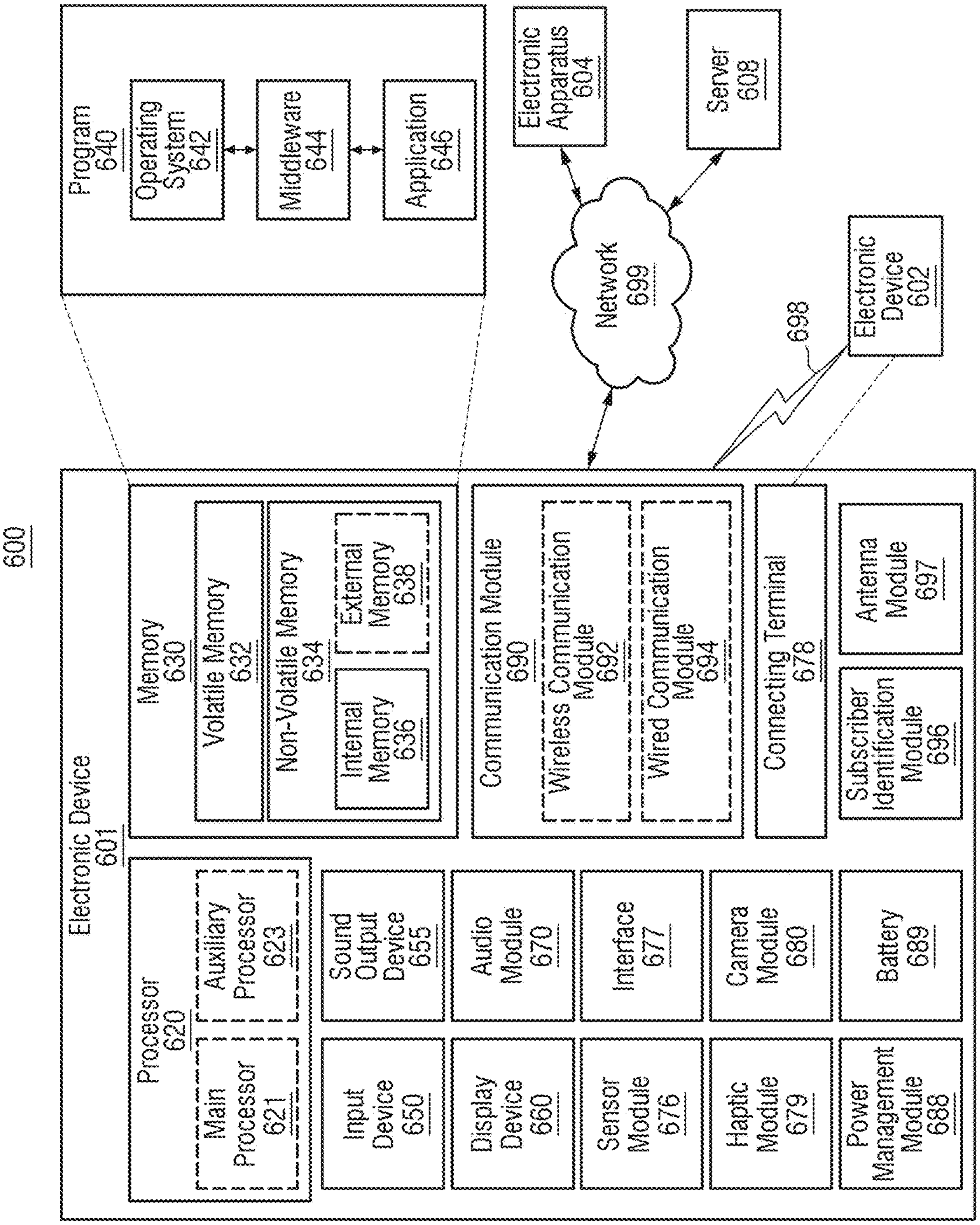
FIG. 11 is a block diagram of an electronic apparatus according to some example embodiments.

FIG. 11 is a block diagram of an electronic apparatus according to some embodiments.

Referring to FIG. 11, an electronic apparatus 601 inside a network environment 600 may communicate with an electronic apparatus 602 through a first network 698, such as a short-range wireless communication network, or may communicate with an electronic apparatus 604 and/or a server 608 through a second networks 699, such as a long-range wireless communication network. In some example embodiments, such an electronic apparatus 601 may be, for example, a notebook computer, a laptop computer, a portable mobile terminal, and/or the like, but embodiments are not limited thereto.

The electronic apparatus 601 may communicate with the electronic apparatus 604 through the server 608. The electronic apparatus 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696, an antenna module 697, and/or the like.

In some embodiments, for example, at least one of the components, such as the display device 660 and/or the camera module 680, may be omitted from the electronic apparatus 601, and/or one or more other components may be added to the electronic apparatus.

In some example embodiments, some of the components may be implemented on a single integrated circuit (IC). For example, the sensor module 676 such as a fingerprint sensor, an iris sensor, and/or an illumination sensor may be buried in an image display device such as a display. In some example embodiments, the sensor module 676 may include the temperature management unit (160 of FIG. 1) explained above.

The processor 620 may execute software (e.g., program 640) that controls other components of at least one electronic apparatus 601, such as hardware or software components connected to the processor 620, to perform various data processing and calculations.

As at least some of data processing or calculations, the processor 620 may load command or data received from other components such as, for example, the sensor module 676 or the communication module 690, into the volatile memory 632, process the commands or data stored in the volatile memory 632, and store the resulting data in the non-volatile memory 634.

The processor 620 may include a main processor 621 such as, for example, a central processing unit (CPU) or an application processor (AP), and an auxiliary processor 623 that operates independently of or in conjunction with the main processor 621.

Such an auxiliary processors 623 may include, for example, a graphic processing unit (GPU), an image signal processor (ISP), a sensor hub processor, a communications processor (CP), or the like.

In some embodiments, the auxiliary processor 623 may be configured to consume less power than the main processor 621 or perform specific functions. The auxiliary processor 623 may be separated from the main processor 621 or may be implemented as a part thereof.

The auxiliary processor 623 may control at least some of the functions or statuses associated with at least one component among the components of the electronic apparatus 601, in place of the main processor 621 while the main processor 621 is being inactive, or together with the main processor 621 while the main processor 621 is being active. In some example embodiments, the first core cluster (110 of FIG. 1) explained above may perform the role of the main processor 621, and/or the second core cluster (120 of FIG. 1) may perform the role of the auxiliary processor 623.

The memory 630 may store various types of data used for at least one component of the electronic apparatus 601. The various types of data may include, for example, software such as program 640, and/or input data and/or output data for commands associated therewith. The memory 630 may include a volatile memory 632 and/or a non-volatile memory 634. In some embodiments, the volatile memory 632 may include the memory device (230 of FIG. 1) explained above, and the non-volatile memory 634 may include the storage device (240 of FIG. 1) explained above.

The program 640 may be stored as software in the memory 630, and may include, for example, an operating system (OS) 642, middleware (644) and/or application (646).

The input device 650 may receive commands and/or data to be used for other components of the electronic apparatus 601 from outside of the electronic apparatus 601. The input device 650 may include, for example, a microphone, a mouse and/or a keyboard, and/or a plurality of microphones (10 and 12 of FIG. 1) explained above.

The sound output device 655 may output sound signals to the outside of the electronic apparatus 601. The sound output device 655 may include, for example, a speaker. Multimedia data may be output through the speaker.

The image display device 660 may visually provide information to the outside of the electronic apparatus 601. The image display device may include, for example, a display, a hologram device and/or a projector, and a control circuit for controlling the corresponding one among the display, the hologram device and/or the projector.

In some example embodiments, the image display device 660 may include a touch circuit configured to detect a touch, and/or a sensor circuit such as, for example, a pressure sensor configured to measure intensity of force caused by a touch.

The audio module 670 may convert sound into electrical signals and vice versa. In some example embodiments, the audio module 670 obtains sound through the input device 650, and/or may output the sound through the sound output device 655, and/or through a headphone of the external electronic apparatus 602 connected directly and/or wirelessly to the electronic apparatus.

The sensor module 676 may detect, for example, an operating status of the electronic apparatus 601, such as an output and/or a temperature, and/or an external environmental status of the electronic apparatus 601, such as a user's status, thereby generating an electrical signal and/or a data value corresponding to the detected status. The sensor module 676 may be, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor and/or an illumination sensor.

The interface 677 may support one or more prescribed protocols used for the electronic apparatus 601 connected directly or wirelessly to the external apparatus 602. In some example embodiments, the interface 677 may include, for example, a high definition multimedia interface (HDMI), a universal serial bus (USB) interface, a secure digital (SED) card interface and/or an audio interface.

The connecting terminal 678 may include connectors through which the electronic apparatus 601 may be physically connected to the external electronic apparatus 602. In some example embodiments, the connecting terminal 678 may include, for example, an HDMI connector, a USB connector, an SD card connector and/or an audio connector (e.g., a headphone connector).

The haptic module 679 may convert electrical signals into mechanical stimuli, such as vibration or movement that may be perceived by the user through tactile sensation and/or kinesthetic sensation. In some example embodiments, the haptic module 679 may include, for example, a motor, a piezoelectric elements and/or an electrical stimulator.

The camera module 680 may capture still images and/or motion images. In some example embodiments, the camera module 680 may include one or more lenses, image sensors, image signal processors, flashes, and/or the like.

The power management module 688 may manage power which is supplied to the electronic apparatus 601. The power management module may be implemented, for example, as at least a part of a power management integrated circuit (PMIC).

The battery 689 may provide the power to at least one component of the electronic apparatus 601. According to some example embodiments, the battery 689 may include, for example, a non-rechargeable primary battery, a rechargeable secondary battery and/or a fuel cell.

The communication module 690 may support a direct communication channel and/or a wireless communication channel between the electronic apparatus 601 and an external electronic apparatus, such as, for example, the electronic apparatus 602, the electronic apparatus 606 and/or the server 608, and perform a communication through the established communication channel.

The communication module 690 is operable independently of the processor 620, and may include one or more communications processors that support a direct communication and/or a wireless communication.

In some example embodiments, the communication module 690 may include a wireless communication module 692 such as, for example, a cellular communication module, a short-range wireless communication module and/or a global navigation satellite system (GNSS) communication module, and/or a wired communication module 694 such as, for example, a local area network (LAN) communication module and/or a power line communication (PLC) module.

The corresponding communication module among the communication modules may communicate with the external electronic apparatus through a first network 698 such as, for example, Bluetooth™M, Wi-Fi (wireless-fidelity) direct and/or standard of the Infrared Data Association (IrDA), and/or a second network 699 such as, for example, a mobile communication network, Internet and/or a long distance network.

These various types of communication modules may be implemented as, for example, a single component or a plurality of components separated from each other. The wireless communication module 692 may identify and authenticate the electronic apparatus 601 inside a communication network, such as the first network 698 and/or the second network 699, using subscriber information such as, for example, international mobile subscriber identity (IMSI) stored in the user identification module 696.

In some example embodiments, the first core cluster (110 of FIG. 1) explained above may perform the role of the processor 620, and/or the second core cluster (120 of FIG. 1) may perform the role of the communication module 690.

The antenna module 697 may transmit and/or receive signals or power to or from the electronic apparatus 601. In some embodiments, the antenna module 697 may include one or more antennas from which at least one antenna suitable for communication scheme used inside a communication network, such as the first network 698 or the second network 699, may be selected by the communication module 690. Then, the signal and/or power may be transmitted or received between the communication module and external electronic apparatus through at least one antenna from which the signal or power is selected.

At least some of the aforementioned components are interconnected, and may perform a signal communication between them through, for example, an inter-peripheral communication scheme such as a bus, a general purpose input and output (GPIO), a serial peripheral interface (SPI), and/or a mobile industry processor interface (MIPI).

In some example embodiments, commands and/or data may be transmitted and/or received between the electronic apparatus 601 and the external electronic apparatus 606 through the server 608 connected to the second network 699. Each of the electronic apparatuses 602 and 606 may be of the same type as or different types of apparatus from the electronic apparatus 601. All or part of the operations to be executed on the electronic apparatus 601 may be executed on one or more external electronic apparatuses 602, 606 and/or 608. For example, all or part of the operations to be performed on the electronic apparatus 601 may be performed on one or more external electronic apparatuses 602, 606 and/or 608.

For example, if the electronic apparatus 601 needs to perform a function or service automatically or upon request from a user or other apparatus, the electronic apparatus 601 which performs the function or service may request one or more external electronic apparatuses to perform at least some of the functions or services instead or additionally. One or more external electronic apparatuses that have received the request may perform at least some or the request functions or services or additional functions or additional services associated with the request, and may send the result of performance to the electronic apparatus 601. The electronic apparatus 601 may provide the results as at least some of the response to the request, with or without accompanying further processing of the results. For example, cloud computing, distributed computing or client-server computing techniques may be used for this purpose.

Figure 12:
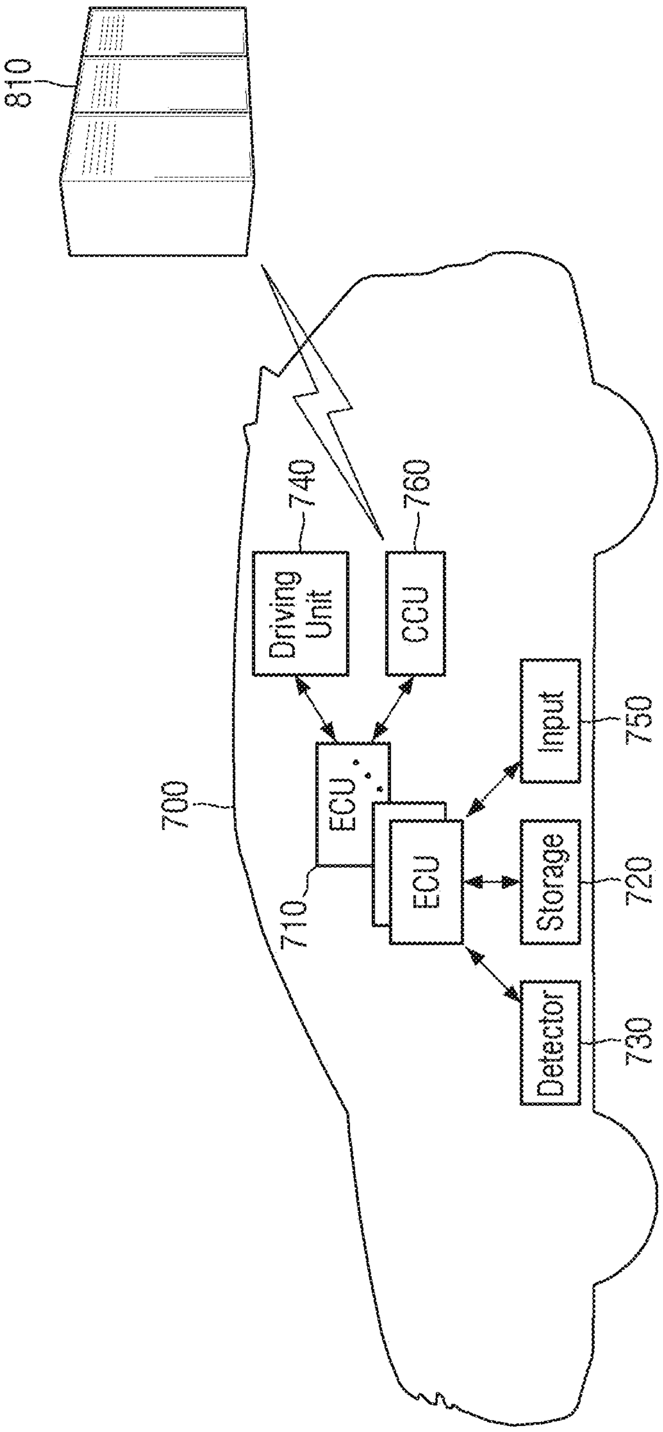
FIG. 12 is a diagram of a vehicle including an electronic control unit according to some example embodiments.

FIG. 12 is a diagram of a vehicle including an electronic control unit according to some example embodiments.

Referring to FIG. 12, a vehicle 700 may include a plurality of electronic control units (ECU) 710, and/or a storage device 720.

Each, or one or more, electronic control unit of the plurality of electronic control units 710 is electrically, mechanically, and/or communicatively connected to at least one of the plurality of devices provided in the vehicle 700, and may control the operation of at least one device on the basis of any one function execution command.

Here, the plurality of devices may include an acquisition device 730 that acquires information necessary to perform at least one function, and/or a driving unit 740 that performs at least one function.

For example, the acquisition device 730 may include various detection units and/or image acquisition units, and the driving unit 740 may include a fan and/or a compressor of an air conditioner, a fan of a ventilation device, an engine and/or a motor of a power device, a motor of a steering device, a motor and/or a valve of a brake device, an opening/closing device of a door or a tailgate, and/or the like.

The plurality of electronic control units 710 may communicate with the acquisition device 730 and/or the driving unit 740 using, for example, at least one of an Ethernet, a low voltage differential signaling (LVDS) communication, and/or a LIN (Local Interconnect Network) communication.

The plurality of electronic control units 710 determine whether there is a need to perform the function on the basis of the information acquired through the acquisition device 730, and when it is determined that the function is needed to perform, the plurality of electronic control units 710 control the operation of the driving unit 740 that performs the corresponding function, and may control an amount of operation on the basis of the acquired information. At this time, the plurality of electronic control units 710 may store the acquired information in the storage device 720, or may read and use the information stored in the storage device 720.

The plurality of electronic control units 710 are able to control the operation of the driving unit 740 that performs the function on the basis of the function execution command that is input through the input unit 750, and are also able to control the operation of the driving unit 740 that checks the setting amount corresponding to the information that is input through the input unit 750 and performs the function on the basis of the checked setting amount.

Each, or one or more, electronic control unit 710 may control any one function independently, or may control any one function in cooperation with other electronic control units.

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and/or distance information to obstacles in cooperation with the electronic control unit of the vehicle terminal, the electronic control unit of the image acquisition unit, and/or the electronic control unit of the collision prevention device, and control the power device, the brake device, and/or the steering device using the received information, thereby performing the autonomous driving.

A connectivity control unit (CCU) 760 is electrically, mechanically, and/or communicatively connected to each, or one or more, of the plurality of electronic control units 710, and communicates with each, or one or more, of the plurality of electronic control units 710.

That is, the connectivity control unit 760 is able to directly communicate with a plurality of electronic control units 710 provided inside the vehicle, is able to communicate with an external server, and is also able to communicate with an external terminal through an interface.

Here, the connectivity control unit 760 may communicate with the plurality of electronic control units 710, and may communicate with a server 810, using an antenna (not shown) and a RF communication.

Further, the connectivity control unit 760 may communicate with the server 810 by wireless communication. At this time, the wireless communication between the connectivity control unit 760 and the server 810 may be performed through various wireless communication schemes such as a GSM (global System for Mobile Communication), a CDMA (Code Division Multiple Access), a WCDMA (Wideband Code Division Multiple Access), a UMTS (universal mobile telecommunications system), a TDMA (Time Division Multiple Access), and/or an LTE (Long Term Evolution), in addition to a Wifi module and a Wireless broadband module.

In some example embodiments, the first core cluster (110 of FIG. 1) explained above may perform the role of the electronic control unit 710, and the second core cluster (120 of FIG. 1) may perform the role of the connectivity control unit 760.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In concluding the detailed description, those skilled in the art will appreciate that many variations and modifications may be made to the example embodiments without substantially departing from the principles of the inventive concepts. Therefore, the disclosed example embodiments of the inventive concepts are used in a generic and descriptive sense only and not for purposes of limitation.

What is claimed is:

1. A system on chip comprising:

a first core cluster configured to execute a first virtual machine loaded into a memory, the first core cluster including a plurality of first cores; and a second core cluster configured to execute a second virtual machine loaded into the memory, the second core cluster including a plurality of second cores, wherein a first core of the plurality of first cores is configured to execute the first virtual machine at an exception level (EL) to generate a first temperature value request for a first temperature value indicating a first measured temperature of the system on chip, execute a hypervisor loaded into the memory at another exception level, different from the exception level, to receive the first temperature value from temperature management circuitry, in response to the first temperature value request, and execute the first virtual machine at the exception level to check the received first temperature value, and wherein a second core of the plurality of second cores is configured to execute the second virtual machine at the exception level to generate a second temperature value request for a second temperature value indicating a second measured temperature of the system on chip, execute the hypervisor at the another exception level to receive the second temperature value from the temperature management circuitry, in response to the second temperature value request, and execute the second virtual machine at the exception level to check the received second temperature value.

2. The system on chip of claim 1, wherein the first virtual machine comprises a first operating system (OS), and the second virtual machine comprises a second OS different from the first OS.

3. The system on chip of claim 1, wherein the first core is further configured to execute the first virtual machine at the exception level to control a clock provided to the first core cluster, in response to the received first temperature value being equal to or greater than a threshold.

4. The system on chip of claim 3, wherein the first core is further configured to execute the first virtual machine at the exception level to change a frequency of the clock provided to the first core cluster from a first frequency to a second frequency, in response to the received first temperature value being equal to or greater than the threshold.

5. The system on chip of claim 3, wherein the second core is further configured to execute the second virtual machine at the exception level to transmit a control signal to an RF circuit (RF IC), in response to the received second temperature value being equal to or greater than the threshold.

6. The system on chip of claim 5, wherein the second core is further configured to execute the second virtual machine at the exception level to control the RF circuit such that a communication mode of the RF circuit changes, in response to the received second temperature value being equal to or greater than the threshold.

7. The system on chip of claim 1, wherein the exception level comprises an EL1 and the another exception level comprises an EL2.

8. The system on chip of claim 1, wherein the second core is further configured to execute an application at a further exception level different from the exception level and the another exception level to generate a third temperature value request, and execute the second virtual machine at the exception level to generate the second temperature value request in response to the third temperature value request.

9. The system on chip of claim 8, wherein the further exception level comprises an EL0, the exception level comprises an EL1, and the another exception level comprises an EL2.

10. The system on chip of claim 1, wherein the first core is configured to execute the first virtual machine and operate as an application processor (AP), and the second core is configured to execute the second virtual machine and operate as a communication processor (CP).

11. The system on chip of claim 1, wherein the first core is configured to execute the first virtual machine to operate as an application processor (AP), and the second core is configured to execute the second virtual machine and operates with the AP.

12. An electronic device comprising:

a memory into which a first virtual machine, a second virtual machine, and a hypervisor are loaded;

a system on chip including a first core cluster configured to execute the first virtual machine, the first core cluster including a plurality of first cores, and a second core cluster configured to execute the second virtual machine, the second core cluster including a plurality of second cores; and temperature management circuitry configured to measure a temperature value, wherein a first core of the plurality of first cores is configured to execute the first virtual machine at an exception level to generate a first temperature value request for a first temperature value indicating a first measured temperature of the system on chip, execute the hypervisor at another exception level, different from the exception level, to receive the first temperature value from the temperature management circuitry, in response to the first temperature value request, and execute the first virtual machine at the exception level to check the received first temperature value, and wherein a second core of the plurality of second cores is configured to execute the second virtual machine at the exception level to generate a second temperature value request for a second temperature value indicating a second measured temperature of the system on chip, execute the hypervisor at the another exception level to receive the second temperature value from the temperature management circuitry, in response to the second temperature value request, and execute the second virtual machine at the exception level to check the received second temperature value.

13. The electronic device of claim 12, wherein the first core is further configured to execute the first virtual machine at the exception level to control a clock provided to the first core cluster, in response to the received first temperature value being equal to or greater than a threshold, and the second core is further configured to execute the second virtual machine at the exception level to transmit a control signal to a radio frequency (RF) circuit, in response to the received second temperature value being equal to or greater than the threshold.

14. The electronic device of claim 12, wherein the first core is further configured to execute the first virtual machine at the exception level to control a clock provided to the first core cluster, in response to the received first temperature value being equal to or greater than a threshold, and the second core is further configured to execute the second virtual machine at the exception level to control a clock provided to the second core cluster, in response to the received second temperature value being equal to or greater than the threshold.

15. The electronic device of claim 12, wherein the first virtual machine comprises a first operating system (OS), and the second virtual machine comprises a second OS different from the first OS.

16. The electronic device of claim 12, wherein the first core is further configured to execute an application at a further exception level different from the exception level and the another exception level to generate a third temperature value request, and execute the first virtual machine at the exception level to generate the first temperature value request, in response to the third temperature value request.

17. An electronic device comprising:

a memory device storing an instruction; and a first core and a second core configured to execute the instruction, wherein the instruction, when executed by the first core, is configured to cause the first core to generate a first temperature value request at an exception level, the first temperature value request being a request for a first temperature value indicating a first measured temperature of the electronic device, receive the first temperature value from temperature management circuitry at a another exception level different than the exception level, in response to the first temperature value request, and check the first temperature value received at the exception level, and wherein the instruction, when executed by the second core, is configured to cause the second core to generate a second temperature value request at the exception level, the second temperature value request being a request for a second temperature value indicating a second measured temperature of the electronic device, receive the second temperature value from the temperature management circuitry at the another exception level, in response to the second temperature value request, and check the second temperature value received at the exception level.

18. The electronic device of claim 17, wherein the instruction, when executed by the first core, is configured to cause the first core to control a clock provided to the first core at the exception level, in response to the received first temperature value being equal to or greater than a predetermined value.

19. The electronic device of claim 18, wherein the instruction, when executed by the second core, is configured to cause the second core to provide a control signal to a radio frequency (RF) circuit at the exception level, in response to the received second temperature value being equal to or greater than a threshold.

20. The electronic device of claim 17, wherein the instruction, when executed by the first core, is configured to cause the first core to control a clock provided to the first core at the exception level, in response to the received first temperature value being equal to or greater than a threshold, and wherein the instruction, when executed by the second core, is configured to cause the second core to control a clock provided to the second core at the exception level, in response to the received second temperature value being equal to or greater than the threshold.

* * * * *